US009713909B2

(12) United States Patent
Schreiber et al.

(10) Patent No.: US 9,713,909 B2
(45) Date of Patent: Jul. 25, 2017

(54) SYSTEM FOR ADJUSTING SLIDING BLOCKS OF A MOVABLE CROSSPIECE OF A PRESS

(71) Applicant: Danieli & C. Officine Meccaniche S.P.A., Buttrio (IT)

(72) Inventors: Marco Schreiber, Brescia (IT); Roberto Bonora, Basiglio (IT)

(73) Assignee: Danieli & C. Officine Meccaniche S.P.A., Buttrio (IT)

( * ) Notice: Subject to any disclaimer, the term of this patent is extended or adjusted under 35 U.S.C. 154(b) by 79 days.

(21) Appl. No.: 14/893,827

(22) PCT Filed: May 30, 2014

(86) PCT No.: PCT/IB2014/061840
§ 371 (c)(1),
(2) Date: Nov. 24, 2015

(87) PCT Pub. No.: WO2014/191967
PCT Pub. Date: Dec. 4, 2014

(65) Prior Publication Data
US 2016/0107406 A1    Apr. 21, 2016

(30) Foreign Application Priority Data

May 31, 2013  (IT) .............................. MI2013A0898

(51) Int. Cl.
*B30B 15/04*     (2006.01)
*B21J 13/04*     (2006.01)
(Continued)

(52) U.S. Cl.
CPC .......... *B30B 15/041* (2013.01); *B21C 23/215* (2013.01); *B21J 13/04* (2013.01); *F16C 29/126* (2013.01)

(58) Field of Classification Search
CPC ..... B30B 15/04; B30B 15/041; F16C 33/306; F16C 29/04; F16C 29/12; F16C 2/02;
(Continued)

(56) References Cited

U.S. PATENT DOCUMENTS 2,142,114 A    1/1939  Criley
2,321,741 A *  6/1943  Flowers ................ B30B 15/041
                                                                384/39
(Continued)

FOREIGN PATENT DOCUMENTS

CN    202480422    10/2012
JP    S5877421     5/1983
(Continued)

*Primary Examiner* — Jimmy T Nguyen
(74) *Attorney, Agent, or Firm* — Stetina Brunda Garred & Brucker

(57) ABSTRACT

An adjustment system for adjusting the position of at least one sliding block of a movable crosspiece of a press with respect to the respective column of the press on which the sliding block may slide, a first wedge is integral with the movable crosspiece, a second wedge is sliding on the first wedge, a pin defining an axis and having a first eccentric end accommodated in a cavity provided in the second wedge, a first actuating member adapted to rotate the pin causing the translation of the second wedge along a direction transversal to the axis, a second actuating member adapted to translate the pin from a first locked position to a second unlocked position in which the pin can rotate about the axis.

20 Claims, 7 Drawing Sheets

(51) Int. Cl.
*B21C 23/21* (2006.01)
*F16C 29/12* (2006.01)

(58) Field of Classification Search
CPC .. F16C 3/00; F16C 29/02; F16C 29/29; F16C 29/126; B23B 19/02; B23Q 1/28; B23Q 1/262; B21J 13/04; B21C 23/215
USPC ............ 100/269.17, 269.21, 258 A; 72/456; 384/40, 53, 59; 29/465
See application file for complete search history.

(56) References Cited

U.S. PATENT DOCUMENTS

| | | | | |
|---|---|---|---|---|
| 2,914,362 | A * | 11/1959 | Ott et al. ............... | B23Q 1/262 257/E23.101 |
| RE31,497 | E | 1/1984 | Nelsen | |
| 5,775,212 | A * | 7/1998 | Takao ................... | B30B 15/041 100/214 |
| 2003/0217652 | A1* | 11/2003 | Hisanobu .............. | B30B 15/041 100/269.17 |

FOREIGN PATENT DOCUMENTS

| | | |
|---|---|---|
| JP | H08197296 | 8/1996 |
| JP | H08206895 | 8/1996 |
| JP | 2011152553 | 8/2011 |

\* cited by examiner

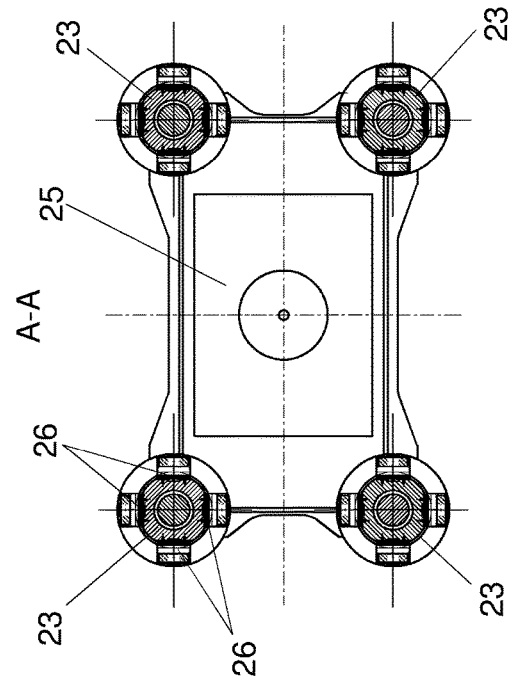
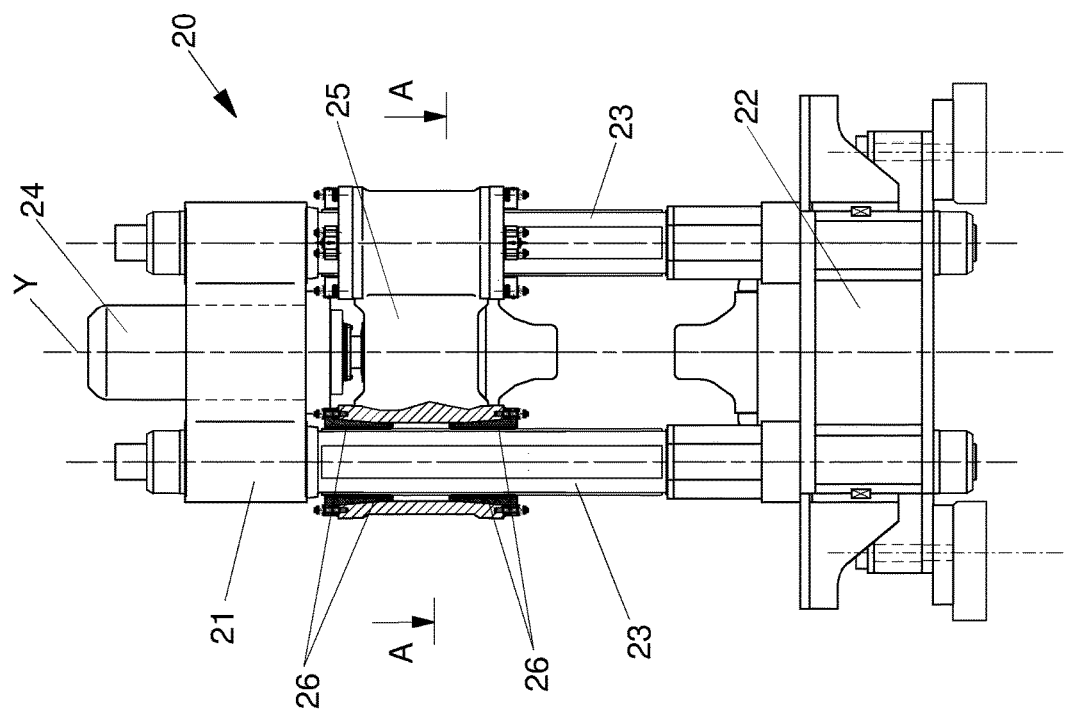
Fig. 1a (PRIOR ART)
Fig. 1 (PRIOR ART)

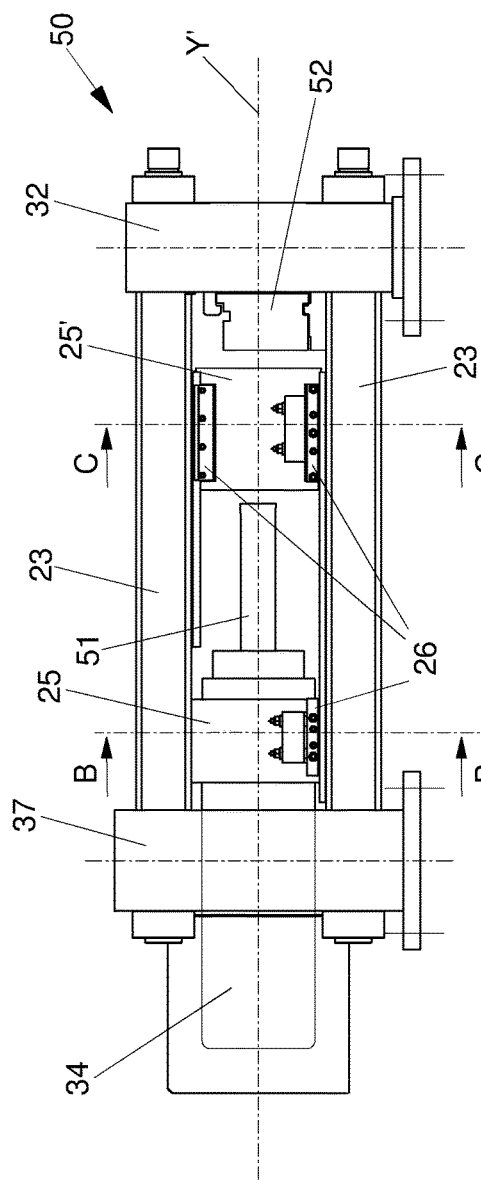
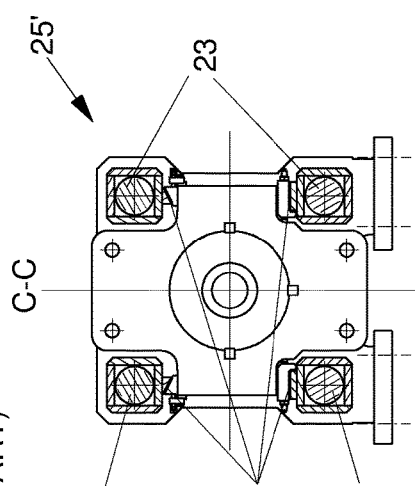
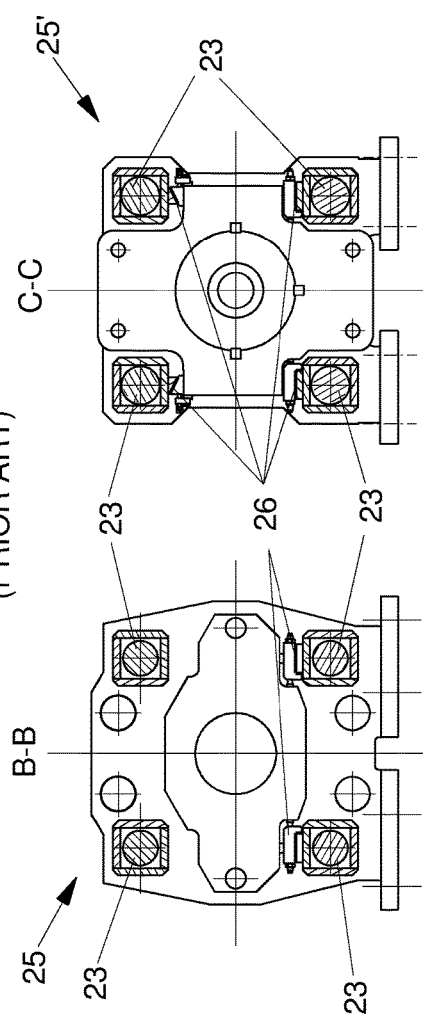
Fig. 2 (PRIOR ART)
Fig. 2a (PRIOR ART)
Fig. 2b (PRIOR ART)

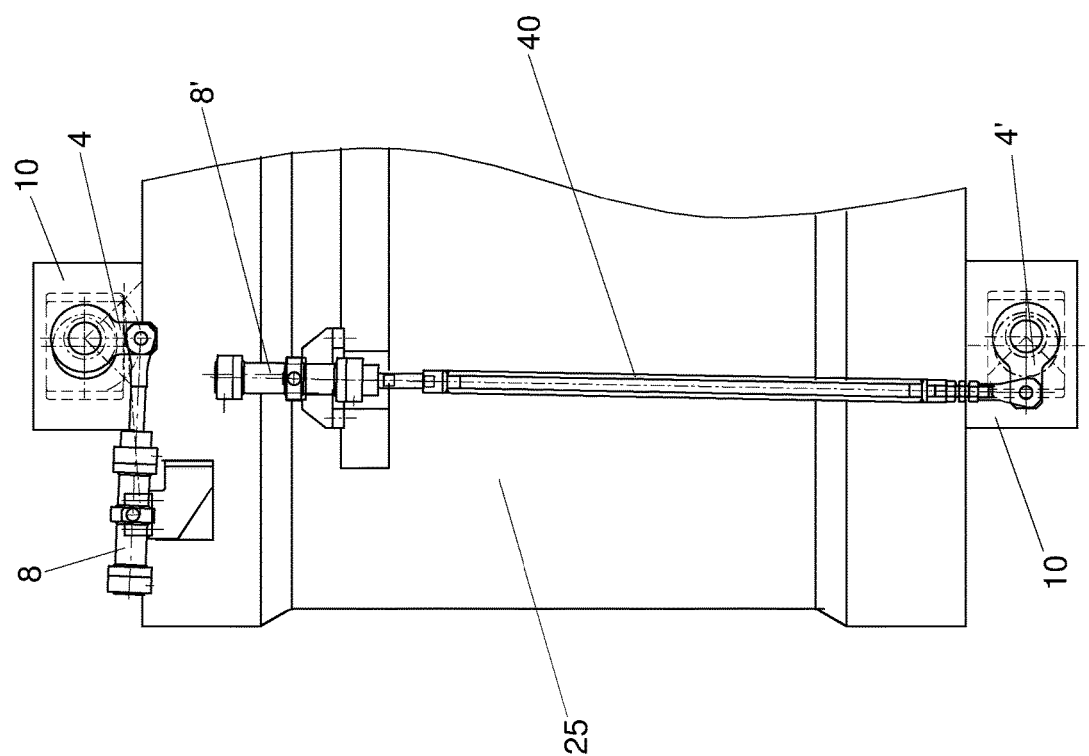

SYSTEM FOR ADJUSTING SLIDING BLOCKS OF A MOVABLE CROSSPIECE OF A PRESS

CROSS REFERENCE TO RELATED APPLICATIONS

The present application claims priority to PCT International Application No. PCT/IB2014/061840 filed on May 30, 2014, which application claims priority to Italian Patent Application No. MI2013A000898 filed May 31, 2013, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to a system for adjusting the position of the sliding blocks of a movable crosspiece inside a press, such as for example a die forging press or an extruding press. Such sliding blocks allow the movable crosspiece, which discharges and distributes the force of the main cylinders on the material to be processed, to move linearly on the press columns.

BACKGROUND OF THE ART

The position of the sliding blocks on the movable crosspieces with respect to the sliding surfaces on the columns of the press may be adjusted during assembly and must be such that it is centred with respect to the movable crosspiece, and in the case of extruding presses also the container-holder crosspiece, with respect to the axis of the press in relation to wear of the sliding blocks and, in the case of a forging press, also in relation to thermal expansions of the movable crosspiece, which is subject to continuous exposure to radiation by the hot worked material during the work shift.

In the prior art, there is a first adjustment procedure based on measurements of the position of the crosspiece (on measurements of the clearance at different positions of the crosspiece in the case of die forging presses), on a theoretical calculation and on the experience of the operating personnel. Such adjustment may be then fine-tuned during the operation of the machine, also due to the wear of the sliding surfaces. The fine-tuning of the adjustment is usually performed occasionally and manually using adjustment screws or wedges and simple shim packages.

In the case of die forging presses, for a good mechanical stability of the press and for an optimal wear of the sliding blocks, it is advantageous to maintain limited clearances. However, for example in the case of die forging presses working in operating conditions of severe and prolonged exposure to radiations, the expansion of the movable crosspiece may be such as to close clearances conventionally acceptable in cold operation, with a subsequent dragging of the sliding blocks thus increasing the wear thereof, up to the locking of the rising movement of the crosspiece itself. Vice versa, in the case of extruding presses, the working hours involve an increasing wear of the sliding blocks, in particular of the lower sliding blocks, determining a lowering of the movable crosspiece and of the container holder crosspiece, sliding horizontally, and therefore a position of said crosspieces no longer centred to the horizontal longitudinal axis of the press. This implies a deterioration of the alignment of the press and a non-optimal quality of the extruded product.

Document JP2011152553 describes a press in which the adjustment of the sliding blocks takes place by means of a wedge moved vertically by an eccentric system. Disadvantageously such solution is bulky and expensive, providing for two parts separate relative to each other of the adjustment system to respectively perform, by means of two separate hydraulic cylinders, the adjustment function of the clearance by means of the eccentric system which shifts the wedge and the locking function of the wedge itself. Furthermore, such adjustment system is arranged inside the movable crosspiece, making this system more complex and difficult to access. The eccentric pin which allows adjusting the position of the movable wedge with respect to the fixed wedge, integral to the movable crosspiece, also passes through said fixed wedge, whereby numerous mechanical processes are needed to implement this technical solution.

The need of providing an adjustment system that allows the above drawbacks to be overcome is therefore felt.

SUMMARY OF THE INVENTION

A primary object of the present invention is to provide a system for adjusting the sliding blocks of the movable crosspiece of a press which is compact and easily accessible.

A further object of the invention is to provide a system for adjusting the sliding blocks of the movable crosspiece which may operate automatically and without need of manual operations.

The present invention, therefore, aims to achieve the above objects by providing an adjustment system for adjusting the position of at least one sliding block of a movable crosspiece of a press with respect to a respective column of the press on which said sliding block can slide, the adjustment system comprising, a first wedge, adapted to be integral with said movable crosspiece;

a second wedge on which said sliding block can be fixed, said second wedge being adapted to slide on said first wedge;

a pin defining an axis X and having a first eccentric end with respect to said axis, said first eccentric end being accommodated in a cavity provided in said second wedge;

first actuating means for actuating the pin adapted to rotate said pin about the axis X, so that by rotating the pin, the first eccentric end causes a sliding of the second wedge on the first wedge along a direction transversal to the axis X;

in which second actuating means for actuating the pin are provided, adapted to translate the pin along said axis X from a first position in which the pin is locked to a second position in which the pin is unlocked and can rotate about the axis (X), and in which said pin is arranged completely external to the first wedge.

A second aspect of the present invention provides a press which, comprises at least one movable crosspiece sliding along columns of said press, said movable crosspiece being provided with sliding blocks, in which systems for adjusting the position of at least one of said sliding blocks with respect to the respective column are provided according to the foregoing description.

A third aspect of the present invention relates to a process for adjusting the position of at least one sliding block of a movable crosspiece of a press with respect to the respective column of said press, by means of an adjustment system as indicated above, the process comprising, the following steps:

a) translate the pin along the axis X, by means of the second actuating means, from the first position in which the pin is locked to the second position in which the pin is unlocked and can rotate about the axis X;

b) rotating the pin about the axis in a first direction of rotation, by means of the first actuating means, for sliding the second wedge on the first wedge up to closing the gap between sliding block and the column;

c) rotating the pin about the axis X in a second direction of rotation, opposite to the first direction of rotation, by means of the first actuating means, for sliding the second wedge on the first wedge up to obtaining a predetermined clearance or a predetermined relative position between the sliding block and the column.

Advantageously the invention implies a series of advantages with respect to the conventional solutions of the prior art; in particular it is possible to achieve:

- the absence of oil under pressure inside the adjustment system during processing (the possibilities of fires are reduced and therefore safety is increased);
- a simple, compact and interchangeable adjustment system;
- an easily accessible adjustment system in that it is arranged completely external to the movable crosspiece;
- less mechanical processing to implement the adjustment system;
- a locking/unlocking device of the pin and of the movable wedge integrated in the adjustment system of the position of the sliding blocks, in particular integrated in the second actuating means.

Such locking device allows locking the pin in said first locked position, in which the second wedge remains fixed, that is, it cannot slide with respect to said first wedge. Advantageously suck locking/unlocking device coincides with said actuating means of the adjustment system of the invention. Therefore, the solution of the invention provides for a single component block, and not parts separated relatively to each other, to respectively perform, by means of a single hydraulic cylinder, both the adjusting function of the clearance by means of the eccentric system and the locking function of the movable wedge.

The dependent claims describe preferred embodiments of the invention.

BRIEF DESCRIPTION OF THE FIGURES

Further features and advantages of the invention will appear more clearly from the detailed description of a preferred but non exclusive embodiment of an adjustment system, illustrated by way of a non-limiting example with the aid of the accompanying drawing tables, in which:

FIG. 1 shows a schematic side view of a die forging press of the prior art;

FIG. 1a shows a schematic sectional view along plane A-A of the press of FIG. 1;

FIG. 2 shows a schematic side view of an extruding press of the prior art;

FIG. 2a shows a schematic sectional view along plane B-B of the press of FIG. 2;

FIG. 2b shows a schematic sectional view along plane C-C of the press of FIG. 2;

FIG. 7 shows a sectional view of an adjustment system according to the invention applied to a movable crosspiece.

The same reference numerals in the figures identify the same elements or components.

DETAILED DESCRIPTION OF PREFERRED EMBODIMENTS OF THE INVENTION

Figure 3:
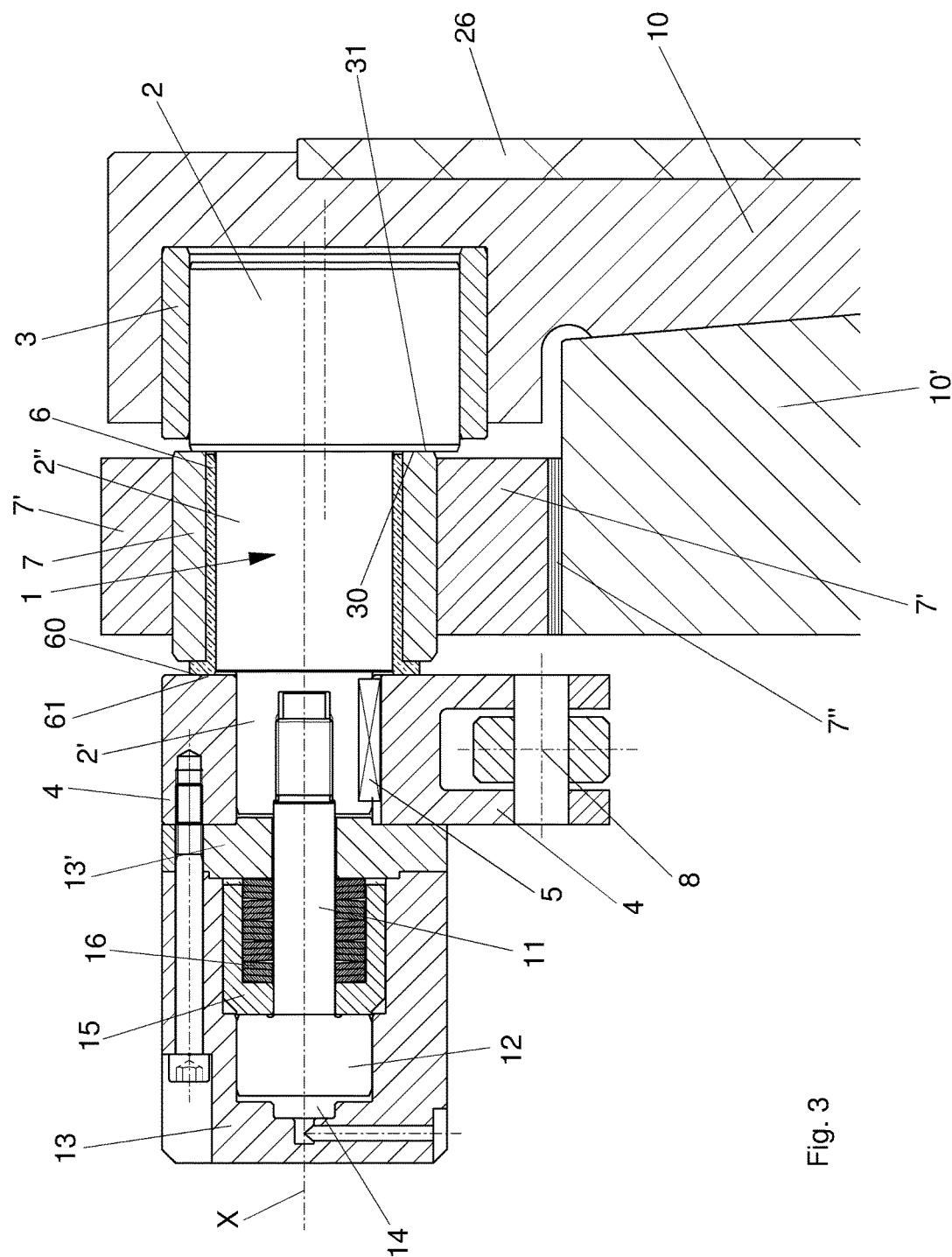
FIG. 3 shows a sectional view of a first embodiment of the adjustment system according to the invention, in a first operating position.

With reference to FIGS. 3-7, preferred embodiments of a system for adjusting the position of the sliding blocks of a movable crosspiece with respect to the columns of a press are shown.

Generally, a forging press for forging metallic products, defining a longitudinal axis Y, comprises (FIGS. 1, 1a) a structure 20 provided with an upper fixed crosspiece 21, a basement 22 parallel to the upper fixed crosspiece and fixed at the foundation, and at least two columns 23 which connect the fixed crosspiece 21 and the basement 22 with each other. At least one actuating device 24, for example a hydraulic cylinder, is fixed to the upper fixed crosspiece 21 and acts vertically on a movable crosspiece 25. Sliding blocks 26, provided in a number of at least two at each edge of the movable crosspiece 25, allow the same movable crosspiece, which discharges and distributes the force of the actuating device 24 on the material to be forged, to slide upwards or downwards along the columns 23 of the press.

Advantageously, adjustment systems according to the present invention are provided to adjust the clearance between said sliding blocks 26 and the respective columns 23. The adjustment system of the invention may be applied to all sliding blocks or, more advantageously, to a subassembly of the same: on a four-column press, for example, it is advantageous to apply the system of the invention on the four internal lower sliding blocks which are those subjected to the greatest clearance variation because of the severe thermal transients to which the lower surface of the movable crosspiece is subjected.

The adjustment system, object of the present invention, may also be applied to an extruding press defining a longitudinal axis Y' and comprising (FIGS. 2, 2a, 2b) a structure 50 provided with a first fixed crosspiece 37; a second fixed crosspiece 32 parallel to the first fixed crosspiece, both the crosspieces being fixed at the foundation; and at least four longitudinal columns 23 which rigidly connect first fixed crosspiece 37 and second fixed crosspiece 32 with each other. At least one actuating device 34, for example a hydraulic cylinder, is fixed to the first fixed crosspiece 37 and acts horizontally on a movable crosspiece 25 to provide the thrust or deformation force of a billet to extrude. Sliding blocks 26, provided at each lower edge of the movable crosspiece 25, allow the same movable crosspiece, which discharges and distributes the force of the actuating device 34 on the material to be extruded, to slide to the right or to the left along the columns 23 of the press. A presser stem 51, as an extension of the hydraulic cylinder 34, has the function of compressing the billet inside a hole provided in a container against a die 52. Said container has the function of containing the billet inside its own hole, during the extrusion process, and to route the metal flow inside the die 52 shaped so as to achieve the desired shape of the product. The die 52 adheres against the second fixed crosspiece 32 which has the task of contrasting the force of the hydraulic cylinder 34. At the centre thereof, there is a hole which allows the exit of the section bar generated in the die 52. Once finished extruding the billet, the container retracts relative to the die 52, being accommodated in a container holder movable crosspiece 25'. The forward-backward longitudinal movement of the container along the axis Y' of the press is controlled by further actuating devices. Further sliding blocks 26, provided at each edge of the container holder movable crosspiece 25', allows the same movable crosspiece 25' to slide to the right or to the left along the columns 23 of the press.

Advantageously, adjustment systems according to the present invention are provided to adjust the position of the sliding blocks 26 with respect to the respective columns 23. The adjustment system of the invention may be applied to all the sliding blocks or, more advantageously, to a sub-assembly of the same: for example, it is advantageous to apply the system of the invention to the lower sliding blocks, subjected to a greater wear than the upper sliding blocks which causes a mis-alignment of the movable crosspieces 25, 25' with respect to the axis Y'.

The system for adjusting the position of at least one sliding block 26 with respect to the respective column 23, object of the present invention, is based on a movable wedge 10 moved by an eccentric shaft device.

Such adjustment system comprises:
a fixed wedge 10' integral to the movable crosspiece; said fixed wedge being fixable to the frame of the movable crosspiece or an integral part of said frame;
a movable wedge 10 on which the sliding block is fixed, said movable wedge 10 being adapted to slide on the fixed wedge 10';
a pin 1 defining an axis X and having a first eccentric end 2 or eccentric shaft, with respect to said axis X, said first eccentric end 2 being at least partially accommodated in a cavity provided in the movable wedge 10;
first means for actuating the pin 1 adapted to rotate the pin 1 about the axis X, so that by rotating the pin 1, the first eccentric end 2 causes a sliding of the movable wedge 10 on the fixed wedge 10' along a direction transversal to the axis X.

The first eccentric end 2 of the pin 1 may be inserted inside a slide 3 accommodated in the cavity of the movable wedge 10 and which has the possibility of translate horizontally with respect to the movable wedge 10.

Advantageously, the pin 1 is arranged completely external to the fixed wedge 10', and the entire adjustment system of the invention is arranged completely external to the movable crosspiece 25 of the press. This implies a considerable constructional simplicity, significantly reducing the number of mechanical processes and a greater accessibility to the adjustment system itself.

Advantageously, second actuating means of the pin 1 are provided to translate the pin 1 along the axis X from a working position of the press in which the pin 1 is locked, without being able of moving, to a rest position of the press in which the same pin 1 is unlocked and may rotate about the axis X to adjust the position of the sliding block. Said second actuating means are integrally fixed to the first actuating means and define a locking/unlocking device of the pin 1 and of the movable wedge 10, adapted to keep the pin 1 locked in said working position and to shift it in the unlock position, corresponding to said rest position of the press.

Figure 4:
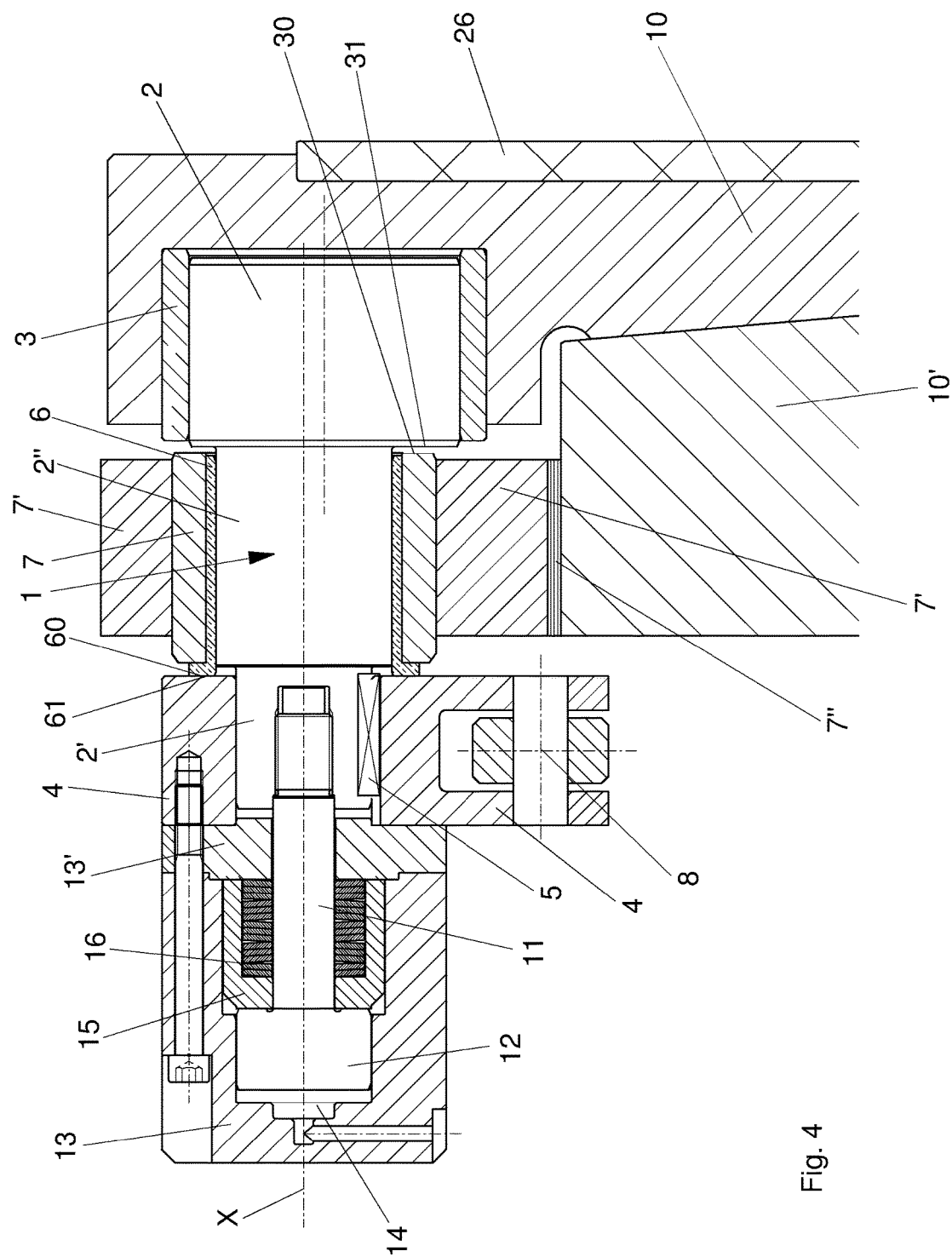
FIG. 4 shows a sectional view of the adjustment system of FIG. 3, in a second operating position.
Figure 5:
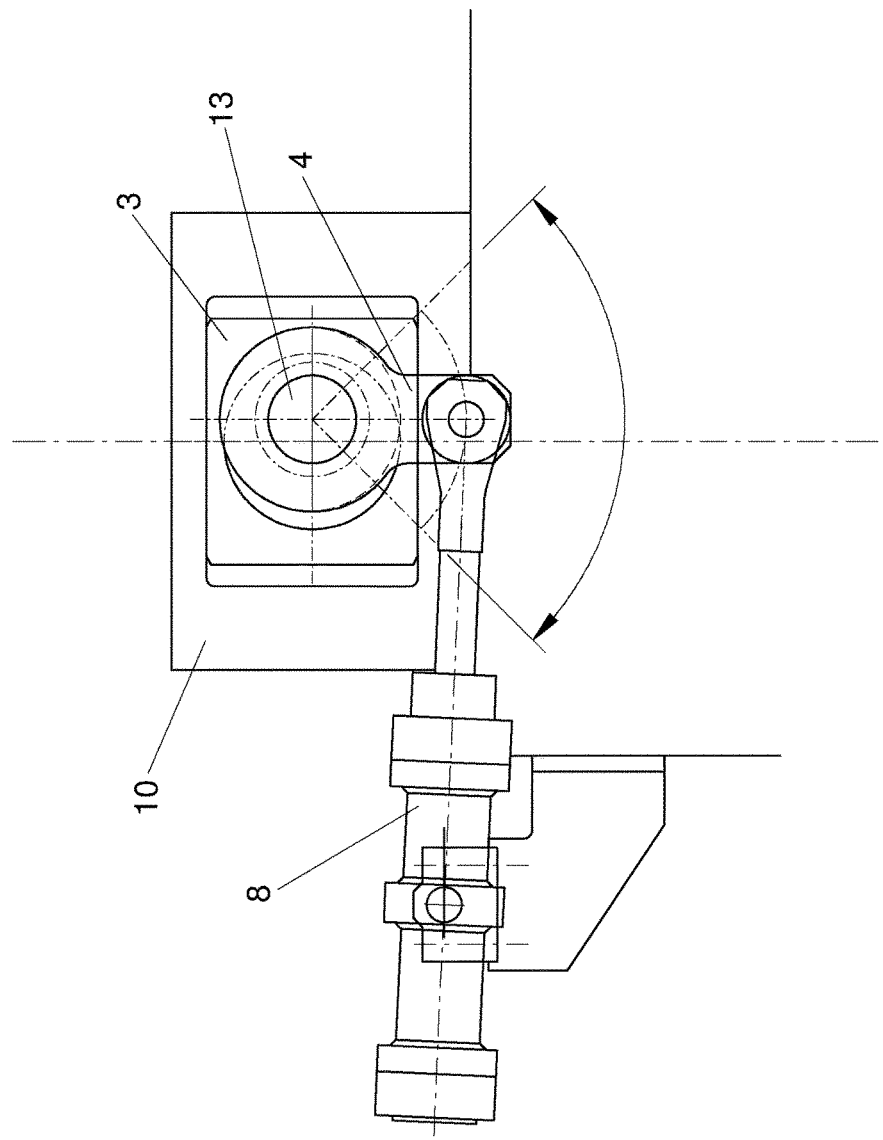
FIG. 5 shows a side view of the adjustment system according to the invention.

In a first advantageous embodiment of the invention, shown in FIGS. 3 and 4, the second actuating means comprise a hydraulic cylinder provided with a liner 13 comprising therein: a chamber 14, a piston 12 slidable in the chamber 14, and at least partially a rod 11 of the piston 12 fixed to a second end 2' of the pin 1.

Elastic means 16 are provided, arranged between the piston 12 and the second end 2' of the pin 1 for opposing resistance to the thrust of the hydraulic cylinder. In the version illustrated in FIGS. 3 and 4, such elastic means 16 identify for example, with a Belleville spring package, placed onto the rod 11. Other suitable elastic means may be used as an alternative to Belleville springs. A spacer 15, having a U-shaped cross-section, separates said springs both from the piston 12 and the liner 13, and has the purpose of limiting the travel of piston 12 along the axis X in the unlock step of the system. Inside the liner 13, the piston 12 delimits the hydraulic chamber 14 connected to an external source of fluid, for example oil, and the zone occupied by the elastic means 16.

In a preferred version the first actuating means comprise a lever 4, which may slide with a clearance on the pin 1 in the direction of the axis X, and a moving device 8, for example a linear moving device 8, acting on the lever 4 to rotate the lever 4 and pin 1 together about the axis X. In particular, in fact, the pin 1 is rotationally constrained at its second end 2', to the lever 4, for example by means of a cylindrical coupling with a key 5. Being the liner 13, and the optional flange 13', passed through by the rod 11 and interposed between the lever 4 and said liner 13, integrally fixed to the lever 4 and, and mentioned above, being the rod 11 fixed to the second end 2' of the pin 1, the above-mentioned second actuating means rotate about the axis X together with the lever 4 and the pin 1.

The central portion 2" of the pin 1 is arranged inside an anti-friction bushing 6, in turn placed inside a fixed bushing 7. Such fixed bushing 7 is directly fixed to the frame of the movable crosspiece, or, in a preferred version (FIGS. 3 and 4), is accommodated in a support 7', in turn fixed to the frame of the movable crosspiece with calibrated shims 7" interposed which allow a broad initial adjustment of the position of the sliding block.

In the working position of the press, a surface 31 of the first eccentric end 2 of the pin is pressed into contact with a surface 30 (FIG. 3) of the fixed bushing 7 (or alternatively of the anti-friction bushing 6); a surface 60 provided on the anti-friction bushing 6 (or alternatively in the fixed bushing 7 or on the support 7') is pressed into contact with a surface 61 provided on the lever 4; while in the rest position (FIG. 4) of the press a null contact force or a clearance between the surface 30 and the surface 31 and/or between the surface 60 and the surface 61 is provided.

Preferably, said surfaces 30, 31 and/or said surfaces 60, 61 are milled in order to increase the friction therebetween.

The linear moving device 8 of the first actuating means, having the shape of, for example, a hydraulic or electro-mechanical jack, may be provided, in a version, with a position transducer adapted to indirectly measure, by means of a mathematical calculation, the position of the movable wedge 10. Alternatively, the position transducer may be positioned on the same movable wedge 10 for a direct measurement of the position thereof.

In one alternative version, on the contrary, no position transducer is provided, but two adjustable mechanical travel end stops of the linear moving device and two respective travel end sensors are provided.

In a further alternative version the linear moving device 8 consists of a manual jack or of an adjustment screw which only allows a manual movement of the movable wedge 10.

The operation of the above-mentioned adjustment system shall be described hereinafter.

In order to adjust the position of the movable wedge 10 and therefore the position of the sliding block 26 with respect to the column, the adjustment system must be in a unlocked position of the pin 1. The clearance after being set is then maintained stably thanks to the irreversibility of the eccentric 2, i.e. maintaining the pin 1 in a locked position. The operation of the system of FIGS. 3 and 4 shall be described hereinafter in the case of a forging press in which the movable wedge moves vertically. The operation will be similar as to the adjustment of the sliding blocks of the movable crosspiece and of the container holder crosspiece of an extruding press in which the movable wedge moves horizontally.

The unlocked position (FIG. 4) is achieved by inputting oil inside the chamber 14. The pressure of the oil, when it overcomes the resistance of the spring package 16, causes a thrust and an axial displacement of the piston 12 to the right (from FIG. 3 to FIG. 4) and a subsequent axial displacement of the pin 1 to which the piston is rigidly fixed. In this unlocked position, is a clearance, for example, between the surface 31 of the eccentric end 2 of the pin 1 and the surface 30 of the fixed bushing 7 and it is possible to cause the lever 4 and then the pin 1 to rotate, in order to adjust the height of the movable wedge 10.

The pin 1 is rotated about the axis X, for example by a hydraulic or electro-mechanical or manual jack which acts on the lever 4 so that its eccentric end 2 establishes a merely vertical movement to the movable wedge 10. The horizontal movements inherent in the rotation of the eccentric end 2, or simply eccentric, are absorbed by the slide 3 which is free of moving horizontally. Therefore, the pin 1, by rotating inside the anti-friction bushing 6, placed inside the fixed bushing 7, determines the vertical position of the movable wedge 10 thanks to the eccentricity of a terminal part thereof; such position is unequivocally determined in relation to the rotation angle of the pin 1 and the lever 4, and therefore in relation to the linear position of the moving device 8. Anti-friction bushing 6, bushing 7 and wedge 10' are the fixed members of the adjustment system. Slide 3 and wedge 10 are, on the other hand, the members which may undergo a vertical displacement depending on the angular position of the lever 4.

Once adjusted the position of the sliding block, it is maintained stably, bringing the pin 1 to a locked position.

The locked position (FIG. 3), that is the one which is maintained during the operation of the press, is obtained by removing the hydraulic pressure from the chamber 14 (during production, therefore there is no oil under pressure inside the adjustment system) so as to allow the spring package 16 to extend and push the piston 12 to the left (from FIG. 4 to FIG. 3). The piston 12 drags the rod 11 and the pin 1, closing in particular the clearance that existed between the surface 31 of the eccentric end 2 of the pin 1 and the surface 30 of the fixed bushing 7. The friction between the two surfaces 30 and 31, which is proportional to the force with which the spring package 16 pulls the eccentric end 2 of the pin towards the fixed bushing 7, prevents the relative rotation thereof and therefore prevents the vertical movement of the wedge 10. For this reason, in a version, the surfaces 30 and 31 are milled, thus increasing the friction at the circular crown defined by the contact between the surfaces 30 and 31.

If in the single adjustment systems, present at the corners of a movable crosspiece, the linear moving device 8 is provided with a position transducer, the extent of the actual clearance between sliding blocks and respective columns, before the actual adjustment, is measured by means of a rotation in a first direction of the pin 1, and thus of the eccentric 2, to cause the movable wedge 10 to slide on the respective fixed wedge 10' up to closing the clearances between the sliding block 26 and the respective column 23. This closing position of the clearances is measured by the position transducer. Preferably this operation, which is herein referred to as "zero setting", is performed with the movable crosspiece 25 in the upper travel end position, in which the movable crosspiece 25 is forced to a centred position with respect to the upper fixed crosspiece 21 by means of mechanical coupling members, for example tapered pins. Alternatively, the transversal position of the movable crosspiece with respect to the axis Y (FIG. 1), on the horizontal plane, is measured by means of position transducers.

Thereafter, the pin 1, and thus the eccentric 2, is rotated in a second direction of rotation, opposite the first direction, to cause the movable wedge 10 to slide on the respective fixed wedge 10' up to obtaining the desired position or clearance between the sliding block 26 and the respective column 23.

Such zero setting and adjustment procedure may be performed individually on each sliding block or simultaneously on all the sliding blocks provided with the automatic adjustment system according to the invention.

The system of the invention, thanks to the use of the transducer and of an automation system which, by means of a mathematical calculation (known), links the position of the transducer to the opening of the clearance, may therefore work with a "continuous" adjustment along the entire travel available for the linear moving device. Furthermore, thanks to the above-described zero setting procedure, said system is capable of automatically modifying its end scale so as to compensate for the geometrical modifications due, for example, to the progressive wear of the sliding blocks.

The linear moving device 8 is designed so as to close the clearance between the sliding block and the column by developing a force lower that that developed upon opening of the clearance, so that it is always capable of move the movable wedge once all the clearances are closed.

On the contrary, in the case in which, in the single adjustment systems, the linear moving device 8 is not provided with a position transducer but is provided with two adjustable mechanical travel end stops, arranged in two predetermined positions, the system is able of obtaining only two different adjustments of the clearances, which are set by means of a manual adjustment of said mechanical travel end stops; in this case no automatic zero setting procedure is provided.

An advantageous version of the present invention, illustrated in FIG. 7, provides, for the sole adjustment systems of the sliding blocks of the lower area of the movable crosspiece 25 or simply lower sliding blocks, the interposition of a transmission member 40 between a linear moving device 8' and the respective lever 4' to allow the displacement of the device 8' at a remote position, preferably in the proximity of the upper area of the crosspiece 25, and protected with respect to the rest of the adjustment system located in the lower area of the movable crosspiece 25, which area is highly exposed to heat and potential impacts with workpieces and with the handling devices. All the remaining members of the adjustment system of the lower sliding blocks do not differ from what has been described hereinabove.

Figure 6:
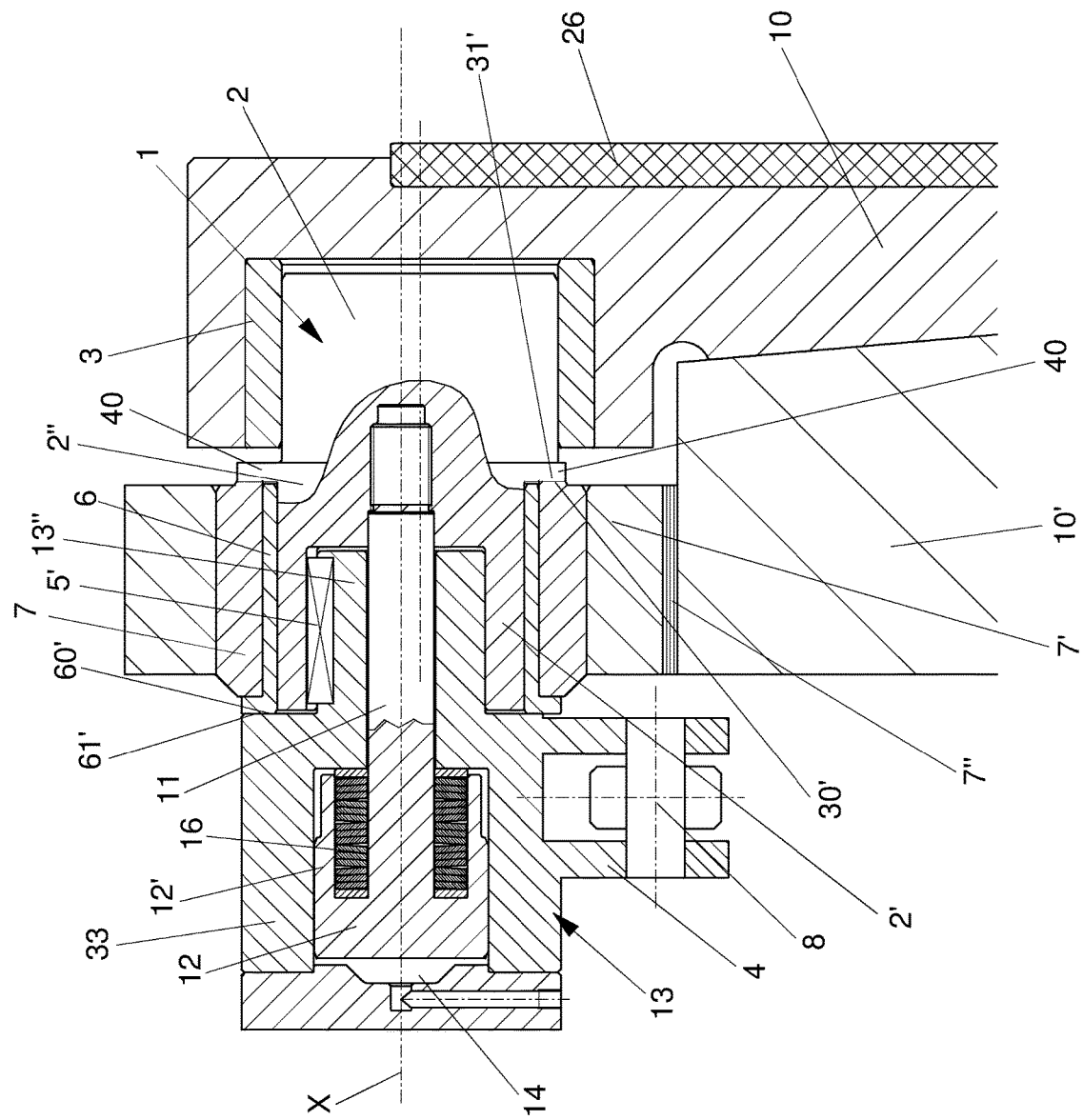
FIG. 6 shows a sectional view of a second embodiment of the adjustment system according to the invention.

In a second advantageous embodiment of the invention, shown in FIG. 6, the second actuating means comprise a hydraulic cylinder provided with a liner 13 comprising therein a chamber 14, a piston 12 slidable in the chamber 14, and at least partially a rod 11 of the piston 12. Such rod 11 is fixed inside the pin 1 and passing through its second end 2' opposite to the first eccentric end 2. In the example of FIG. 6, the rod 11 passes through both the second end 2' and the central portion 2" of the pin 1, also being partially inserted in the first eccentric end 2. Said second end 2' is hollow so as to accommodate therein one end 13" of the liner 13, coaxial to the body 33 of the liner 13 and having a diameter smaller than that of said body 33.

Elastic means 16 are provided, arranged between the piston 12 and the second end 2' of the pin 1 for opposing resistance to the thrust of the hydraulic cylinder. In the version illustrated in FIG. 6, such elastic means 16 identify for example, with a Belleville spring package, placed onto the rod 1. In this version, no spacer 15 is provided, because the cupper springs are accommodated inside an annular cavity delimited by the rod 11, the piston 12 and an annular projection 12' of the same piston 12 which is coaxial and external to said rod 11. This configuration allows separating the springs from the liner 13 and has the purpose of limiting the travel of the piston 12 along the axis X in the unlock step of the system. Inside the liner 13, the piston 12 delimits the hydraulic chamber 14 connected to an external source of fluid, for example oil, and the zone occupied by the elastic means 16.

In this second embodiment of the invention, the first actuating means comprise a moving device 8, for example a linear moving device, acting on a lever 4 which represents a projection of the liner 13 itself. In FIG. 6, liner 13 and lever 4 are made as a single member which may slide with a clearance on the pin 1 in the direction of the axis X. The linear moving device 8 acts on said single member to rotate the liner 13 and pin 1 together about the axis X. In particular, in fact, the pin 1 is rotationally constrained, at its second end 2', to the liner 13, for example by means of a cylindrical coupling with a key 5'.

Being liner 13 and lever 4 a single member, as mentioned hereinabove, and being the rod 11 fixed to the pin 1, the above-mentioned second actuating means rotate about the axis X along with the pin 1.

The central portion 2" and the second end 2' of the pin 1 are arranged inside an anti-friction bushing 6, in turn placed inside a fixed bushing 7. Such fixed bushing 7 is directly fixed to the frame of the movable crosspiece, or, in a preferred version (FIG. 6), is accommodated in a support 7', in turn fixed to the frame of the movable crosspiece with calibrated shims 7" interposed which allow a broad initial adjustment of the clearance between the sliding blocks and the columns.

In the working position of the press (FIG. 6) a surface 31' of an annular projection 40 of the central position 2" of the pin 1 is pressed into contact with a surface 30' of the fixed bushing 7 (or alternatively of the anti-friction bushing 6 or of the support 7'); a surface 60' provided on the anti-friction bushing 6 (or alternatively on the fixed bushing 7 or on the support 7') is pressed into contact with a surface 61' provided on the body 33 of the liner 13; while in the rest position (not shown) of the press a null contact force is provided, that is a clearance between the surface 30' and the surface 31' and/or between the surface 60' and the surface 61'.

Said annular projection 40 delimits the central portion 2" from the eccentric end 2 of the pin 1.

Preferably said surfaces 30', 31' and/or said surfaces 60', 61' are milled to increase the friction therebetween.

For the linear moving device 8 of the first actuating means, what already described above for the first embodiment applies. Also as regards the operation of the second embodiment, what already described above applies with the only difference that in this case the surface 31' of the annular projection 40 replaces the surface 31 of the eccentric end 2 of the first embodiment.

This second embodiment described above is more compact, also being made with a lower number of components.

The elements and the features shown in the different preferred embodiments may be combined with each other without departing from the scope of protection of the present application.

The invention claimed is:

1. An adjustment system for adjusting a position of at least one sliding block of a movable crosspiece of a press with respect to a respective column of the press on which said sliding block can slide, the adjustment system comprising:
   a first wedge, adapted to be integral with said movable crosspiece;
   a second wedge on which said sliding block can be fixed, said second wedge being configured to slide on said first wedge;
   a pin defining an axis and having a first eccentric end with respect to said axis, said first eccentric end being accommodated in a cavity provided in said second wedge;
   first actuating means for actuating the pin to rotate said pin about the axis, so that by rotating the pin, the first eccentric end causes a sliding of the second wedge on the first wedge along a direction transversal to the axis; and
   second actuating means for actuating the pin, wherein said second actuating means configured to translate the pin along said axis from a first position in which the pin is locked to a second position in which the pin is unlocked and can rotate about the axis, and wherein said pin is arranged completely external to the first wedge.

2. The adjustment system according to claim 1, wherein the second actuating means are integrally fixed to the first actuating means.

3. The adjustment system according to claim 1, wherein a locking/unlocking device of the pin and of the second wedge is provided which is integrated in said second actuating means.

4. The adjustment system according to claim 1, wherein said second actuating means comprise a hydraulic cylinder provided with a chamber, a piston sliding in said chamber, and a rod of the piston fixed to a second end of the pin.

5. The adjustment system according to claim 4, wherein elastic means are provided, arranged between the piston and the second and of the pin for opposing resistance to a thrust of the hydraulic cylinder.

6. The adjustment system according to claim 5, wherein said elastic means are separate from a liner of the hydraulic cylinder and/or from the piston by means of a spacer, or wherein said elastic means are separate from a liner of the hydraulic cylinder, said elastic means being accommodated into an annular cavity delimited by the rod, by the piston and by an annular projection of said piston.

7. The adjustment system according to claim 1, wherein said first actuating means comprise a lever and a moving device acting on the lever for rotating the lever about the axis.

8. The adjustment system according to claim 7, wherein said second actuating means are adapted to rotate about the axis together with the pin.

9. The adjustment system according to claim 6, wherein said first actuating means comprise a lever and a moving device acting on the lever for rotating the lever about the axis.

10. The adjustment system according to claim 9, wherein the lever is rotationally constrained to the pin with respect to the axis, and the liner is integrally fixed to said lever; or wherein the lever and the liner form a single element rotationally constrained to the pin with respect to the axis.

11. The adjustment system according to claim 6, wherein at least one portion of the pin is inside an anti-friction bushing, in turn located inside a further bushing fixable to the movable crosspiece; and wherein said further bushing is accommodated in a support fixable to the movable crosspiece with calibrated shims interposed between the support and the movable crosspiece.

12. The adjustment system according to claim 11, wherein in the first position
   a first surface of the further bushing or of the anti-friction bushing or of the support is pressed into contact with a second surface of the first eccentric end of the pin or with a second surface of an annular projection of the pin which delimits a central portion of the pin from said first eccentric end,
   and a third surface of the further bushing or of the anti-friction bushing of the support is pressed into contact with a fourth surface of the liner,
   while in the second position there is provided a clearance between said first surface and said second surface and/or between said third surface and said fourth surface.

13. The adjustment system according to claim 12, wherein said first surface and said second surface are milled, and/or wherein said third surface and said fourth surface are milled.

14. The adjustment system according to claim 1, wherein a position transducer is provided for directly or indirectly measuring a position of the second wedge.

15. The adjustment system according to claim 7, wherein two adjustable mechanical end stops of the moving device are provided.

16. a The adjustment system according to claim 9, wherein two adjustable mechanical end stops of the moving device are provided.

17. A press comprising at least one movable crosspiece sliding along columns of said press, said movable crosspiece being provided with sliding blocks, wherein adjustment systems are provided for adjusting a position of at least one of said sliding blocks with respect to the respective column, said adjustment system comprising:
   a first wedge, adapted to be integral with said movable crosspiece;
   a second wedge on which said sliding block can be fixed, said second wedge being configured to slide on said first wedge;
   a pin defining an axis and having a first eccentric end with respect to said axis, said first eccentric end being accommodated in a cavity provided in said second wedge;
   first actuating means for actuating the pin to rotate said pin about the axis, so that by rotating the pin the first eccentric end causes a sliding of the second wedge on the first wedge long a direction transversal to the axis; and
   second actuating means for actuating the pin, wherein said second actuating means configured to translate the pin along said axis from a first position in which the pin is locked to a second position in which the pin is unlocked and can rotate about the axis, and wherein said pin is arranged completely external to the first wedge.

18. The press according to claim 17, wherein said adjustment systems are arranged completely external to the movable crosspiece.

19. A process for adjusting a position of at least one sliding block of a movable crosspiece of a press, with respect to a respective column of said press, by means of an adjustment system comprising: a first wedge adapted to be integral with said movable crosspiece, a second wedge on which said sliding block can be fixed, said second wedge being configured to slide on said first wedge, a pin defining an axis and having a first eccentric end with respect to said axis, said first eccentric end being accommodated in a cavity provided in said second wedge; first actuating means for actuating the pin adapted to rotate said pin about the axis so that by rotating the pin the first eccentric end causes a sliding of the second wedge on the first wedge along a direction transversal to the axis, and second actuating means for actuating the pin, wherein said pin is arranged completely external to the first wedge, the process comprising the following steps:
   a) translating the pin along the axis, by the second actuating means, from a first position in which the pin is locked to a second position in which the pin is unlocked and can rotate about the axis;
   b) rotating the pin about the axis in a first direction of rotation, by the first actuating means, for sliding the second wedge on the first wedge up to closing a gap between the sliding block and the column; and
   c) rotating the pin about the axis in a second direction of rotation, opposite to the first direction of rotation, by the first actuating means, for sliding the second wedge on the first wedge up to obtaining a predetermined clearance or a predetermined position between the sliding block and the column.

20. The process according to claim 19, wherein before step a), the movable crosspiece is centred with respect to a fixed crosspiece or to the columns; or wherein before step a), a position of the movable crosspiece on a plane perpendicular to a longitudinal axis of the press is measured by means of position transducers.

\* \* \* \* \*